United States Patent [19]

DeCapo

[11] Patent Number: 5,564,659
[45] Date of Patent: Oct. 15, 1996

[54] CONDUIT HANGING APPARATUS

[76] Inventor: Robert T. J. DeCapo, 152 Springdale La., Bloomingdale, Ill. 60108

[21] Appl. No.: 440,369

[22] Filed: May 12, 1995

[51] Int. Cl.$^6$ ...................................................... A47F 7/00
[52] U.S. Cl. ............................................................ 248/72
[58] Field of Search ............................ 248/68.1, 71, 73, 248/74.2, 74.1, 62

[56] References Cited

U.S. PATENT DOCUMENTS

| | | | |
|---|---|---|---|
| 1,373,716 | 4/1921 | Dottl | 248/22 |
| 1,571,144 | 1/1926 | Saignol | 248/72 X |
| 2,273,571 | 2/1942 | Hafemeister | 248/62 |
| 3,292,888 | 12/1966 | Fischer | 248/72 |
| 4,479,625 | 10/1984 | Martz | 248/62 X |
| 4,957,251 | 9/1990 | Hubbard | 248/68.1 |
| 5,141,186 | 8/1992 | Cusic | 248/68.1 X |
| 5,443,232 | 8/1995 | Kesinger | 248/68.1 X |

Primary Examiner—Alvin C. Chin-Shue
Assistant Examiner—Sarah L. Purol
Attorney, Agent, or Firm—Brezina & Ehrlich

[57] ABSTRACT

A conduit hanging apparatus for securing conduit to a support strut having upper, lower, and side surfaces includes a conduit clip having two compressible members depending from a base portion where each compressible member is disposed on opposite sides of the conduit. Each compressible member has a lower end disposed opposite the base portion and a recess disposed between the lower end and the base portion where the recess is configured to engage and retain the conduit. A strut clamp secured around a portion of the upper and lower surfaces of the strut is arranged to support the conduit clip and the conduit. A fastening means is provided for securing the base portion of the conduit clip to the strut clamp. Also included is a clamping mechanism operatively coupled to the lower end of each compressible member to draw the lower ends together such that the recess of each compressible member provides a frictional fit to retain the conduit disposed therebetween.

12 Claims, 2 Drawing Sheets

CONDUIT HANGING APPARATUS

BACKGROUND OF THE INVENTION

The present invention relates generally to an improved pipe and conduit hanging apparatus and more specifically to a conduit clip and support strut that quickly and inexpensively secures conduit to a support strut for use primarily in the electrical industry.

Pipe and conduit hanging devices are frequently used in factory and commercial structures for supporting pipes and conduit from ceilings or overhead areas. In such installations, the pipe and conduit hanging devices are typically secured to ceiling beams and overhead trusses. In recent years, there has been a significant increase in the use of pipes and conduit for the transmission of fluids, such as oil or water, and to encase electrical conductors, such as power wiring, computer wiring, and communication cables, in both industrial and residential applications. Such conduit and pipe are also used for the transmission of gases.

Often, such pipe and conduit hanging devices are constructed from prefabricated parts to attempt to reduce on-site labor costs. However, even using prefabricated components, assembly is often slow due in part to archaic design considerations.

Known pipe and conduit hanging devices, such as beam clamps, typically require insertion of a bolt extending from a collar carrying the pipe, into a mating bore of the beam clamp. Due to poor lighting conditions often surrounding such a location, and a generally unfavorable position of the installer with respect to the work being performed, even the simple operation of threading the bolt can become a time-consuming as well as a tedious task. This results in increased costs and time delays.

Attempts to effect rapid and easy assembly of such conduit hanging devices is often thwarted due to the fact that the bolt may twist and turn and become cross-threaded or otherwise displaced, thereby requiring repositioning and realignment. Beam clamps are relatively expensive and use of multiple beam clamps along a length of pipe may adversely increase the cost of a construction project. Other known pipe and conduit hanging devices require insertion of a bolt into two separate aligned bores of a beam clamp. This often limits the adjustability of the bolt relative to the clamp, thus increasing costs when the clamps must be relocated.

C-clamps affixed to top beams are often used to suspend pipe and conduit. These clamps include a set screw for securing the clamp in position and a pipe hanging rod threaded into the lower jaw of the clamp. In this type of clamp both the supported weight of the pipe and the pressure of the set screw act in the same direction on the lower jaw. Thus, the supported weight of the pipe and any increase thereof resulting from vibration or use of the pipe act to bend the lower jaw and loosen the set screw. This may cause a decrease in the load bearing capacity of the clamp and eventual failure of the hanging device resulting in potential damage or injury.

Support trusses or struts are often used to mount electrical conduit where such conduit is typically mounted on top of the support strut. However, in some installations where multiple conduits are crowded along a support strut, there is insufficient room on the support strut to mount an additional required conduit. Often, a second support strut is suspended below the first support strut to provide a surface upon which the conduit may be mounted. Installation of a second support strut is expensive and time-consuming.

Accordingly, it is an object of the present invention to provide a conduit hanging device which overcomes the above problems.

It is another object of the present invention to provide a novel conduit hanging apparatus that quickly and easily secures conduit and pipe to a support strut.

It is yet another object of the present invention to provide a novel conduit hanging apparatus that allows pipe and conduit to be mounted below a support strut.

SUMMARY OF THE INVENTION

The disadvantages of known conduit and pipe hanging apparatus are substantially overcome with the present invention by providing a novel conduit hanging apparatus which allows conduit and pipe to be secured below a support strut or deep channel strut when no further space is available along the support strut to secure an additional length of conduit.

A series of conduit clips attached to support struts allow long lengths of additional conduit or pipe to be supported beneath existing crowded struts without the need to add an additional support strut. Each conduit clip includes a base portion having two depending compressible members which secure the conduit. The base portion is fastened to a strut clamp which is disposed around the strut between existing conduit hanging devices. The clamp is narrow enough to fit between existing conduit hanging devices situated along the strut even though there is insufficient room to add another length of conduit using the existing devices.

More specifically, a conduit hanging apparatus for securing conduit to a support strut having upper, lower, and side surfaces includes a conduit clip having two compressible members depending from a base portion where each compressible member is disposed on opposite sides of the conduit. Each compressible member has a lower end disposed opposite the base portion and a recess disposed between the lower end and the base portion where the recess is configured to engage and retain the conduit. A strut clamp secured around a portion of the upper and lower surfaces of the strut is arranged to support the conduit clip and the conduit. A fastening means is provided for securing the base portion of the conduit clip to the strut clamp. Also included is a clamping mechanism operatively coupled to the lower end of each compressible member to draw the lower ends together such that the recess of each compressible member provides a frictional fit to retain the conduit disposed therebetween.

The features of the present invention which are believed to be novel are set forth with particularity in the appended claims. The invention, together with further objects and advantages thereof, may best be understood by reference to the following description in conjunction with the accompanying drawings.

DETAILED DESCRIPTION OF THE INVENTION

Figure 1:
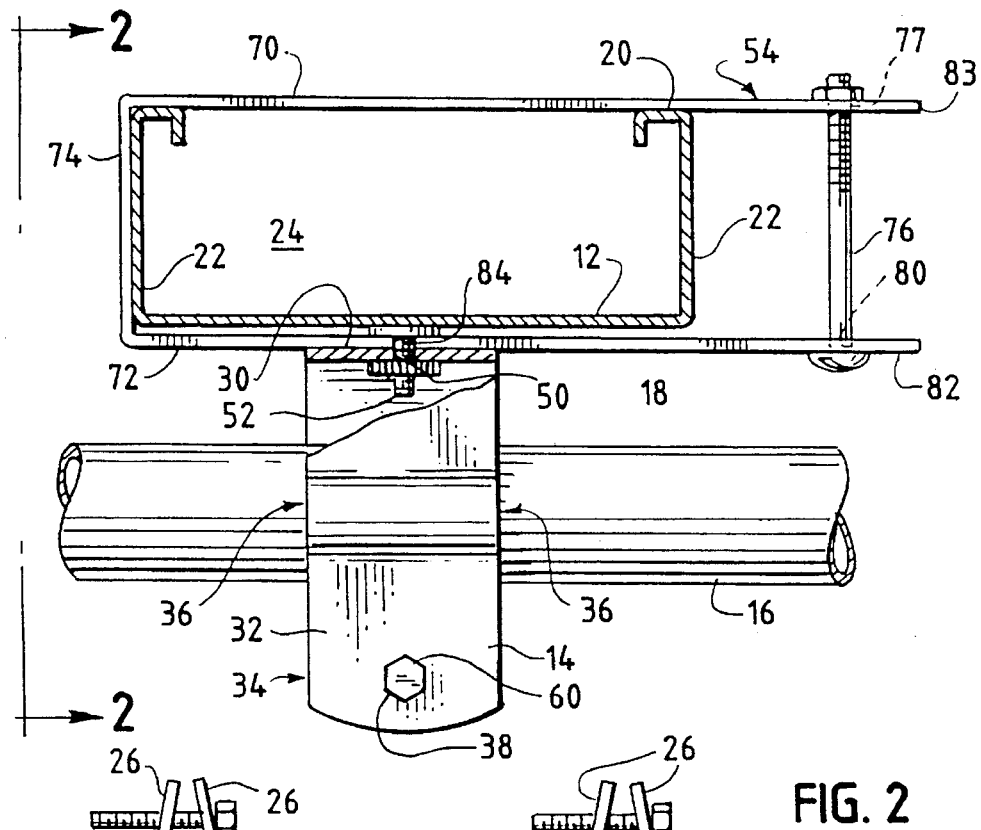
FIG. 1 is a side elevational view of a support strut and a front elevational view of a conduit clip shown in an operative position according to a specific embodiment of the present invention.
Figure 2:
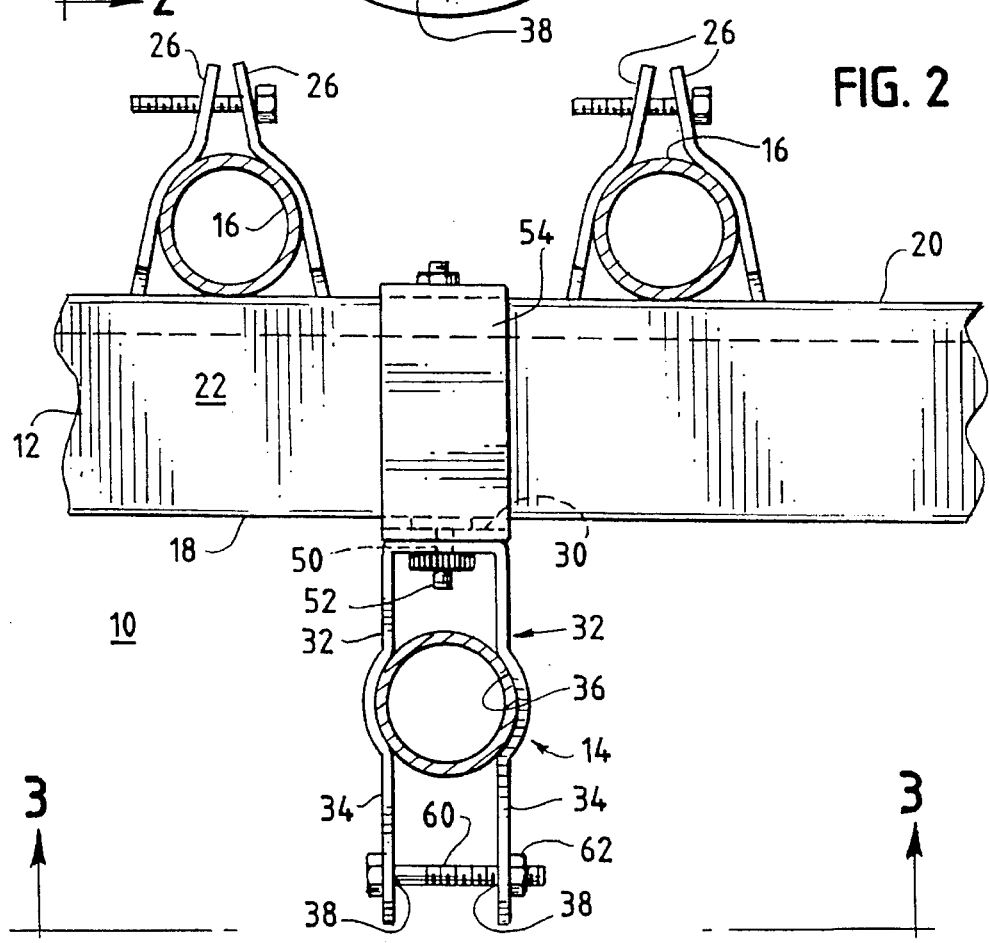
FIG. 2 s a side elevational view of a specific embodiment of a conduit clip shown in an operative position taken along the line 2—2 of FIG. 1 in the direction generally indicated.
Figure 3:
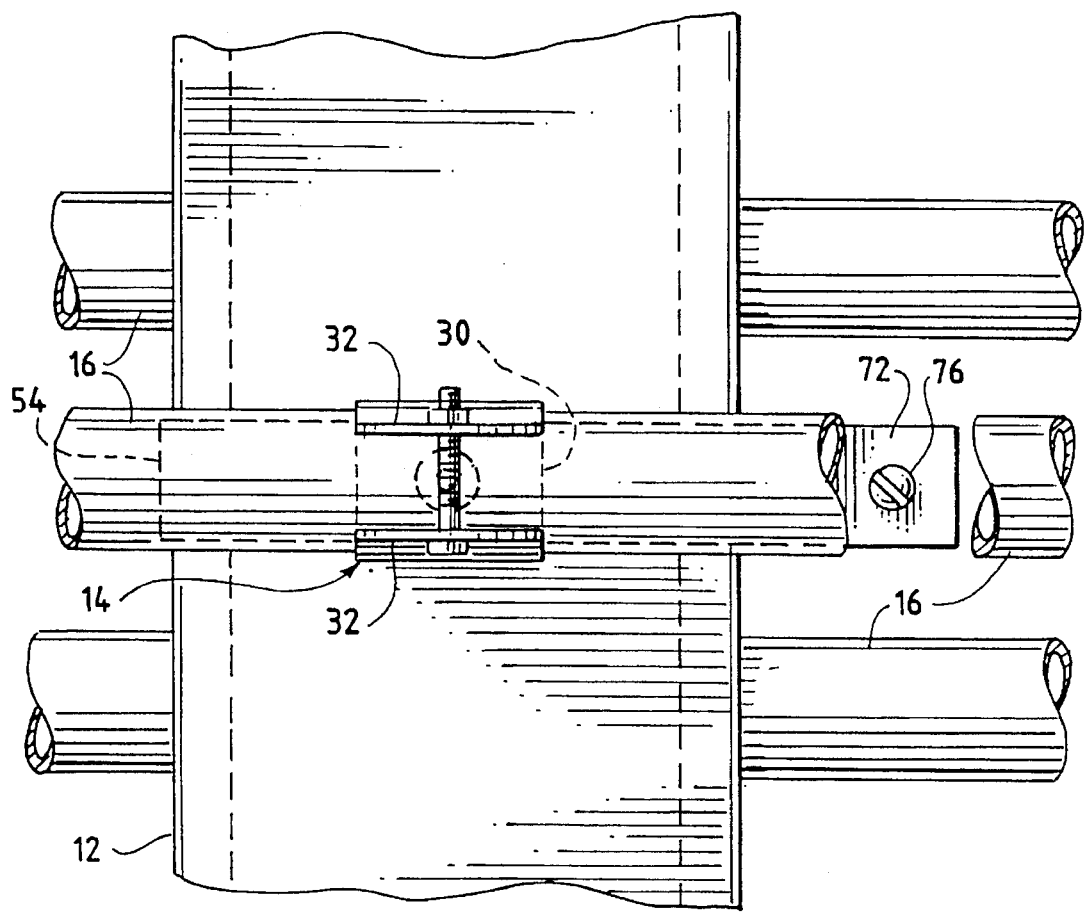
FIG. 3 is a bottom plan view of a specific embodiment of a conduit clip shown in an operative position taken along the line 3—3 of FIG. 2 in the direction generally indicated.

Referring now to FIGS. 1–3, a conduit hanging apparatus 10 is shown generally. The conduit hanging apparatus 10 includes a support strut 12 or deep-channel strut and a conduit clip 14 for securing conduit or pipe 16 to the strut 12.

The support strut 12, for example, may be manufactured and sold under the name of UNISTRUT and may be manufactured in a variety of lengths and widths depending upon the particular application and the expected weight of the conduit 16 to be supported. Such support struts 12 are often used to support conduit carrying electrical conductors but may also be used to support pipe carrying a variety of fluids or gases, as is well known in the art.

The known support strut 12 is typically formed from a single piece of metal by stamping or extrusion techniques, as is well known in the art. The support-strut 12 includes a lower surface 18 and an upper surface 20 which both extend to define the length of the strut. The strut 12 includes two spaced apart side walls 22 which upwardly project from the lower surface 18 forming a channel 24 therebetween, thus the strut has a generally U-shaped cross-section. The support strut 12 may be affixed to ceiling beams or other supporting structures by any suitable means. For example, the support strut 12 may be suspended from an overhead support structure using wire or cable and the like. Known conduit braces 26 secure each length of conduit 16 to the upper surface 20 of the support strut 12.

The conduit clip 14 includes a base portion 30 having two compressible members 32 depending from the base portion. Each compressible member 32 has a lower end 34 disposed opposite the base portion 30, a recess 36 disposed between the lower end and the base portion, and an aperture 38 in the lower end to allow for compression of the lower ends. The recess 36 may be of any suitable contour which corresponds to the expected contour of the conduit 16. The recess 36 is configured to engage and retain the conduit 16. The base portion 30 and the two compressible members 32 may be integrally formed from a single piece of material, such as aluminum, steel other suitable material.

The base portion 30 includes a fastening aperture 50 through which a stud 52 or other suitable fastening device may pass. The stud 52 secures the base 30 of the conduit clip 14 to a strut clamp 54, as will be described hereinafter.

FIG. 2 best depicts the compressible members 32 disposed on opposite sides of the conduit 16 so that the conduit is held in place between the recess 36. A compression bolt 60 may be inserted through the apertures 38 of the lower ends 34 and a nut 62 may be affixed to the compression bolt to compress and urge the lower ends towards each other. The compression bolt 60 secures the lower ends 34 of the compressible members 32 together providing a structure which fixes and secures the conduit 16 between the compressible members. However, any clamping mechanism operatively coupled to the lower end 34 of each compressible member 32 may be used to draw the lower ends together. For example, a rivet, a screw, a spring or any other suitable fastening or clamping mechanism may be used, as is well known in the art.

Referring now to FIG. 1, in the illustrated embodiment, the strut clamp 54 is generally U-shaped. The strut clamp 54 is secured around the upper surface 20 and the lower surface 18 of the strut 12 and is arranged to support the weight of the conduit clip 14 and the conduit. The strut clamp 54 includes a first portion 70 to engage the upper surface 20, a second portion 72 parallel to the first portion to engage the lower surface 18, and a third portion 74 generally perpendicular to the first and second portions configured to rigidly connect the first and second portions. The third portion 74 is generally parallel to and abuts the leftmost side wall 22 of the strut 12, as shown in FIG. 1. The strut clamp 54 may be integrally formed from a single piece of metal or other suitable material, as is well known in the art.

A fourth portion 76 operatively connected to the first 70 and second 72 portions is configured to retain the first and second portions in the parallel arrangement while compressing the strut 12 therebetween. The fourth portion 76 permits the strut clamp 54 to resist bending of the second portion 72 away from strut under the weight of the conduit 16. The fourth portion 76 may, for example, be a threaded bolt, or other suitable fastener which may be inserted into a first aperture 80 disposed in a distal end 82 of the second portion 72. The end of the threaded bolt 76 is received by a threaded aperture 77 disposed in a distal end 83 of the first portion 70. The threaded bolt 76 is tightened to draw the first portion 70 and second portion 72 together thus, clamping the strut 12 therebetween. Note that the first aperture 80 and the threaded aperture 77 may be reversed in position so that the threaded bolt 76 may be reversed in position.

The second portion 72 of the strut clamp 54 includes a centrally disposed aperture 84 through which the stud 52 projects. The stud 52 may, for example, be a stud rivet which is securely affixed to the second portion 72. The end of the stud 52 projecting through the central aperture 84 is threaded. The stud 52 depends downwardly and away from the second portion 72 and is received through the fastening aperture 50 in the base portion 30. A nut 90 may then be placed over the threaded end of the stud 52 and tightened to firmly secure the base portion 30 to the strut clamp 54.

Referring now to FIGS. 1 and 2, in operation, the strut clamp 54 is positioned around the strut 12 where sufficient space exists between existing conduit brackets 26. Next, the fourth portion 76, or bolt, is inserted through the aperture 80 in the second portion 72 and the end of the bolt is received by the threaded aperture 77 in the first portion 72. The bolt 76 is then tightened to secure the strut clamp 54 to the strut 12 while compressing the strut therebetween.

The conduit clip 14 is then raised towards the strut clamp 54 and the stud 52 is received by the fastening aperture 50 of the base portion 30. The nut 90 is then positioned over the stud 52 and is tightened to secure the base portion 30 of the conduit clip 14 to the strut clamp 54.

Next, the conduit 16 is raised toward the conduit clip 14 and is positioned such that the compressible members 32 of the conduit clip 14 are arranged about opposite sides of the circumference of the conduit 16. The recesses 36 of the compressible members 32 generally conform to the contour of the conduit. Next, the compression bolt 60 is inserted through the apertures 38 in the lower end 34 of both compressible members 32 and the nut 62 is secured to the compression bolt and tightened. Tightening the nut 62 draws the lower ends 34 together and compresses or clamps the conduit 16 between the recesses 36 to provide a frictional fit to retain the conduit disposed therebetween. The weight of the conduit 16 is essentially supported by the conduit clip 14 which is fixed to the strut clamp.

A specific embodiment of the conduit hanging apparatus according to the present invention has been described for the purpose of illustrating the manner in which the invention may be made and used. It should be understood that implementation of other variations and modifications of the invention and its various aspects will be apparent to those skilled in the art, and that the invention is not limited by these specific embodiments described. It is therefore contemplated to cover by the present invention any and all modifications, variations, or equivalents that fall within the true spirit and scope of the basic underlying principles disclosed and claimed herein.

What is claimed is:

1. A conduit hanging apparatus for securing conduit to a support strut, the support strut having upper and lower surfaces and side walls connecting the upper and lower surfaces, the conduit hanging apparatus comprising:

a conduit clip having two compressible members depending from a base portion, each compressible member being disposed on opposite sides of the conduit;

each compressible member having a lower end disposed opposite the base portion and a recess disposed between the lower end and the base portion, said recess configured to engage and retain the conduit;

a strut clamp having a first portion, a second portion parallel to the first portion, and a third portion connecting the first and second portions;

said strut clamp configured to engage and retain the support strut with said first and second portions of the strut clamp disposed parallel to and in contact with the upper and lower surfaces of the support strut, respectively, to minimize a portion of the strut clamp projecting above the upper surface of the support strut, said strut clamp arranged to support the conduit clip and the conduit;

fastening means configured to secure the base portion of the conduit clip to the strut clamp; and a clamping mechanism operatively coupled to the lower end of each compressible member to draw the lower ends together such that the recess of each compressible member provides a frictional fit to retain the conduit disposed therebetween.

2. The apparatus of claim 1 wherein the compressible members include an aperture in the lower end configured to receive the clamping mechanism.

3. The apparatus of claim 1 wherein the first portion of the strut clamp engages the upper surface of the support strut, the second portion of the strut clamp engages the lower surface of the support strut, and the third portion of the strut clamp rigidly connects the first and second portions.

4. The apparatus of claim 3 wherein the strut clamp is U-shaped with the first, second, and third portions being integrally formed from a single piece of material, said first portion being parallel to the second portion.

5. The apparatus of claim 3 wherein the strut clamp further includes a fourth portion operatively connected to the first and second portions, said fourth portion configured to retain the first and second portions in a parallel arrangement while compressing the strut therebetween and configured to resist bending of the second portion away from strut.

6. The apparatus of claim 3 wherein the fastening means depends from an aperture disposed in the second portion of the strut clamp and configured to engage the base portion such that the conduit clip is secured to the strut clamp.

7. In combination, a support strut and a conduit clip for securing conduit to the support strut, the combination comprising:

the support strut having an upper and a lower surface and side walls connecting the upper and the lower surface;

the conduit clip having two compressible members depending from a base portion, each compressible member being disposed on opposite sides of the conduit;

each compressible member having a lower end disposed opposite the base portion and a recess disposed between the lower end and the base portion, said recess configured to engage and retain the conduit;

a strut clamp having a first portion, a second portion parallel to the first portion, and a third portion connecting the first and second portions;

said strut clamp configured to engage and retain the support strut with said first and second portions of the strut clamp disposed parallel to and in contact with the upper and lower surfaces of the support strut, respectively, to minimize a portion of the strut clamp projecting about the upper surface of the support strut, said strut clamp arranged to support the conduit clip and the conduit;

fastening means configured to secure the base portion of the conduit clip to the strut clamp; and a clamping mechanism operatively coupled to the lower end of each compressible member to draw the lower ends together such that the recess of each compressible member provides a frictional fit to retain the conduit disposed therebetween.

8. The apparatus of claim 7 wherein the compressible members include an aperture in the lower end configured to receive the clamping mechanism.

9. The apparatus of claim 7 wherein the first portion of the strut clamp engages the upper surface of the support strut, the second portion of the strut clamp engages the lower surface of the support strut, and the third portion of the strut clamp rigidly connects the first and second portions.

10. The apparatus of claim 9 wherein the strut clamp is U-shaped with the first, second, and third portions being integrally formed from a single piece of material.

11. The apparatus of claim 9 wherein the strut clamp includes a fourth portion operatively connected to the first and second portions and configured to retain the first and second portions in a parallel arrangement while compressing the strut therebetween and configured to resist bending of the second portion away from strut.

12. The apparatus of claim 9 wherein the fastening means depends from an aperture disposed in the second portion of the strut clamp and configured to engage the base portion such that the conduit clip is secured to the strut clamp.

\* \* \* \* \*